US011093532B2

(12) United States Patent
Eda et al.

(10) Patent No.: US 11,093,532 B2
(45) Date of Patent: Aug. 17, 2021

(54) PRE-ALLOCATING FILESYSTEM METADATA WITHIN AN OBJECT STORAGE SYSTEM

(71) Applicant: International Business Machines Corporation, Armonk, NY (US)

(72) Inventors: Sasikanth Eda, Pune (IN); John T. Olson, Tucson, AZ (US); Sandeep R. Patil, Pune (IN); Sachin C. Punadikar, Pune (IN)

(73) Assignee: International Business Machines Corporation, Armonk, NY (US)

( * ) Notice: Subject to any disclaimer, the term of this patent is extended or adjusted under 35 U.S.C. 154(b) by 933 days.

(21) Appl. No.: 15/605,509

(22) Filed: May 25, 2017

(65) Prior Publication Data

US 2018/0341697 A1   Nov. 29, 2018

(51) Int. Cl.
*G06F 16/00* (2019.01)
*G06F 16/31* (2019.01)
*G06F 16/11* (2019.01)

(52) U.S. Cl.
CPC .......... *G06F 16/316* (2019.01); *G06F 16/113* (2019.01); *G06F 16/116* (2019.01)

(58) Field of Classification Search
CPC ............. H04L 67/1095; G06F 16/1774; G06F 9/5077; G06F 9/526; G06F 16/10; G06F 21/608; G06F 21/6218; G06F 21/84; G06F 2209/5018; G06F 3/1204; G06F 3/1226; G06F 3/1231; G06F 3/1236; G06F 3/1288; G06F 9/5027; G06F 9/52; G06F 9/546; G06F 3/067; G06F 11/1471; G06F 12/0866; G06F 16/13; G06F 16/172; G06F 16/1727; G06F 16/1734; G06F 16/18; G06F 2009/45579; G06F 2206/1004;

(Continued)

(56) References Cited

U.S. PATENT DOCUMENTS

| 7,430,570 | B1* | 9/2008 | Srinivasan ............ G06F 16/134 |
| 7,822,728 | B1 | 10/2010 | Chandler et al. |
| 7,945,726 | B2 | 5/2011 | Faibish et al. |
| 9,081,898 | B1* | 7/2015 | Antova ............... G06F 11/3476 |
| 9,891,860 | B1* | 2/2018 | Delgado ............... G06F 3/0689 |
| 10,417,121 | B1* | 9/2019 | Suhas ..................... G06F 12/02 |

(Continued)

FOREIGN PATENT DOCUMENTS

| CN | 101149755 A | 3/2008 |
| CN | 101556557 B | 3/2011 |
| WO | 2016018447 A1 | 2/2016 |

OTHER PUBLICATIONS

Kumar et al., "Ext4 Block and Inode Allocator Improvements," Linux Symposium, vol. 1, 2008, pp. 263-276.
Arpaci-Dusseau, "File System Implementation," 2014, pp. 1-18, Retrieved From http://pages.cs.wisc.edu/~remzi/OSTEP/file-implementation.pdf.

* cited by examiner

*Primary Examiner* — Shyue Jiunn Hwa
(74) *Attorney, Agent, or Firm* — Zilka-Kotab, P.C.

(57) ABSTRACT

A computer-implemented method according to one embodiment includes identifying at a pre-allocation module a size of object data to be stored within a storage node, identifying at the pre-allocation module file system parameters associated with the storage node, calculating at the pre-allocation module pre-allocated details needed for storing the object data within the storage node, utilizing the size of the object data and the file system parameters associated with the storage node, and sending the object data and the pre-allocated details from the pre-allocation module to the storage node.

20 Claims, 9 Drawing Sheets

(58) Field of Classification Search
CPC .. G06F 2212/463; G06F 3/0608; G06F 3/064; G06F 3/0643; G06F 9/45558; G06F 11/14; G06F 11/1435; G06F 16/128; G06F 16/1805; G06F 16/1865; G06F 16/21; G06F 16/27; G06F 3/06; G06F 3/0611; G06F 3/0619; G06F 3/0689; G06F 3/065; G06F 2201/84; G06F 11/1469; G06F 11/2094; G06F 11/1458; G06F 11/2038; G06F 11/2097; G06F 16/174; G06F 16/1844; G06F 11/1004; G06F 16/2343; G06F 16/245; G06F 16/248; G06F 16/285; G06F 16/9535; G06F 21/31; G06F 2221/2141; G06F 9/50; G06F 16/24575; G06F 40/00; G06F 9/5072; G06F 9/5083; G06F 9/4881; G06F 9/5044

See application file for complete search history.

(56) References Cited

U.S. PATENT DOCUMENTS

| | | | |
|---|---|---|---|
| 2011/0296411 A1* | 12/2011 | Tang | G06F 9/45545 718/1 |
| 2012/0095970 A1* | 4/2012 | Shyam | G06F 16/134 707/690 |
| 2012/0185437 A1* | 7/2012 | Pavlov | G06F 16/182 707/652 |
| 2017/0075781 A1* | 3/2017 | Bennett, Jr. | G06F 3/0619 |
| 2017/0277715 A1* | 9/2017 | Strauss | G06F 16/1865 |

PRE-ALLOCATING FILESYSTEM METADATA WITHIN AN OBJECT STORAGE SYSTEM

BACKGROUND

The present invention relates to data storage, and more specifically, this invention relates to pre-allocating, pre-populating, and pre-updating data stored within an object storage system.

Object storage enables the storage and management of unstructured data in the form of objects. However, current methods for implementing object storage are unable to pre-allocate data blocks required for an incoming file/object or preemptively perform additional actions associated with incoming file/object storage.

SUMMARY

A computer-implemented method according to one embodiment includes identifying at a pre-allocation module a size of object data to be stored within a storage node, identifying at the pre-allocation module file system parameters associated with the storage node, calculating at the pre-allocation module pre-allocated details needed for storing the object data within the storage node, utilizing the size of the object data and the file system parameters associated with the storage node, and sending the object data and the pre-allocated details from the pre-allocation module to the storage node.

According to another embodiment, a computer program product for pre-allocating filesystem metadata within an object storage system comprises a computer readable storage medium having program instructions embodied therewith, wherein the computer readable storage medium is not a transitory signal per se, and where the program instructions are executable by a processor to cause the processor to perform a method comprising identifying at a pre-allocation module a size of object data to be stored within a storage node, utilizing the processor, identifying at the pre-allocation module file system parameters associated with the storage node, utilizing the processor, calculating at the pre-allocation module, utilizing the processor, pre-allocated details needed for storing the object data within the storage node, utilizing the size of the object data and the file system parameters associated with the storage node, and sending the object data and the pre-allocated details from the pre-allocation module to the storage node, utilizing the processor.

A system according to another embodiment includes a processor, and logic integrated with the processor, executable by the processor, or integrated with and executable by the processor, where the logic is configured to identify at a pre-allocation module a size of object data to be stored within a storage node, identify at the pre-allocation module file system parameters associated with the storage node, calculate at the pre-allocation module pre-allocated details needed for storing the object data within the storage node, utilizing the size of the object data and the file system parameters associated with the storage node, and send the object data and the pre-allocated details from the pre-allocation module to the storage node.

Other aspects and embodiments of the present invention will become apparent from the following detailed description, which, when taken in conjunction with the drawings, illustrate by way of example the principles of the invention.

DETAILED DESCRIPTION

Figure 1:
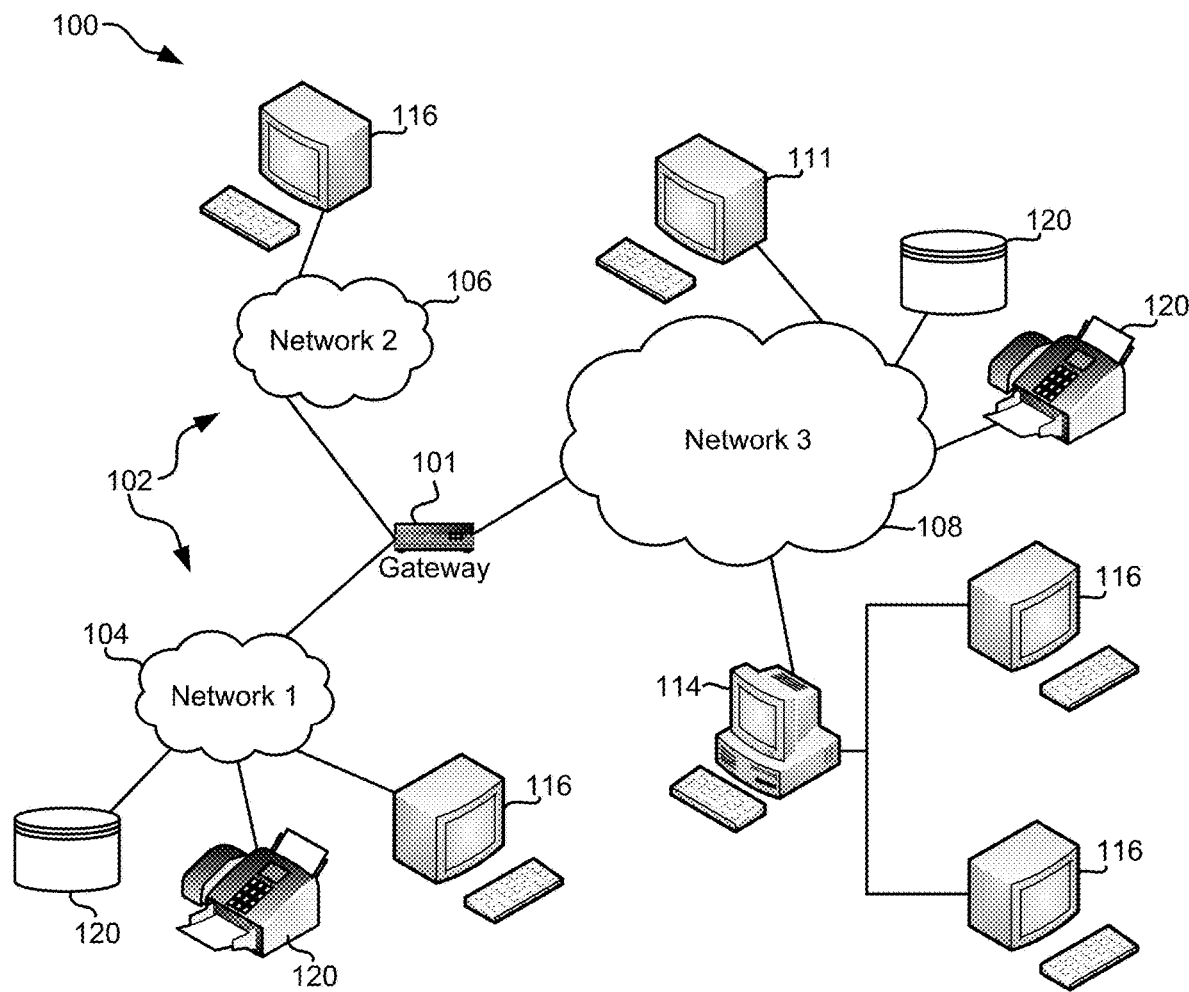
FIG. 1 illustrates a network architecture, in accordance with one embodiment.

The following description discloses several preferred embodiments of systems, methods and computer program products for pre-allocating filesystem metadata within an object storage system. Various embodiments provide a method to determine pre-allocated details needed for storing data within a storage node, based on file system parameters associated with the storage node.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "includes" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for pre-allocating filesystem metadata within an object storage system.

In one general embodiment, a computer-implemented method includes identifying at a pre-allocation module a size of object data to be stored within a storage node, identifying at the pre-allocation module file system parameters associated with the storage node, calculating at the pre-allocation module pre-allocated details needed for storing the object data within the storage node, utilizing the size of the object data and the file system parameters associated with the storage node, and sending the object data and the pre-allocated details from the pre-allocation module to the storage node.

In another general embodiment, a computer program product for pre-allocating filesystem metadata within an object storage system comprises a computer readable storage medium having program instructions embodied therewith, wherein the computer readable storage medium is not a transitory signal per se, and where the program instructions are executable by a processor to cause the processor to perform a method comprising identifying at a pre-allocation module a size of object data to be stored within a storage node, utilizing the processor, identifying at the pre-allocation module file system parameters associated with the storage node, utilizing the processor, calculating at the pre-allocation module, utilizing the processor, pre-allocated details needed for storing the object data within the storage node, utilizing the size of the object data and the file system parameters associated with the storage node, and sending the object data and the pre-allocated details from the pre-allocation module to the storage node, utilizing the processor.

In another general embodiment, a system includes a processor, and logic integrated with the processor, executable by the processor, or integrated with and executable by the processor, where the logic is configured to identify at a pre-allocation module a size of object data to be stored within a storage node, identify at the pre-allocation module file system parameters associated with the storage node, calculate at the pre-allocation module pre-allocated details needed for storing the object data within the storage node, utilizing the size of the object data and the file system parameters associated with the storage node, and send the object data and the pre-allocated details from the pre-allocation module to the storage node.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
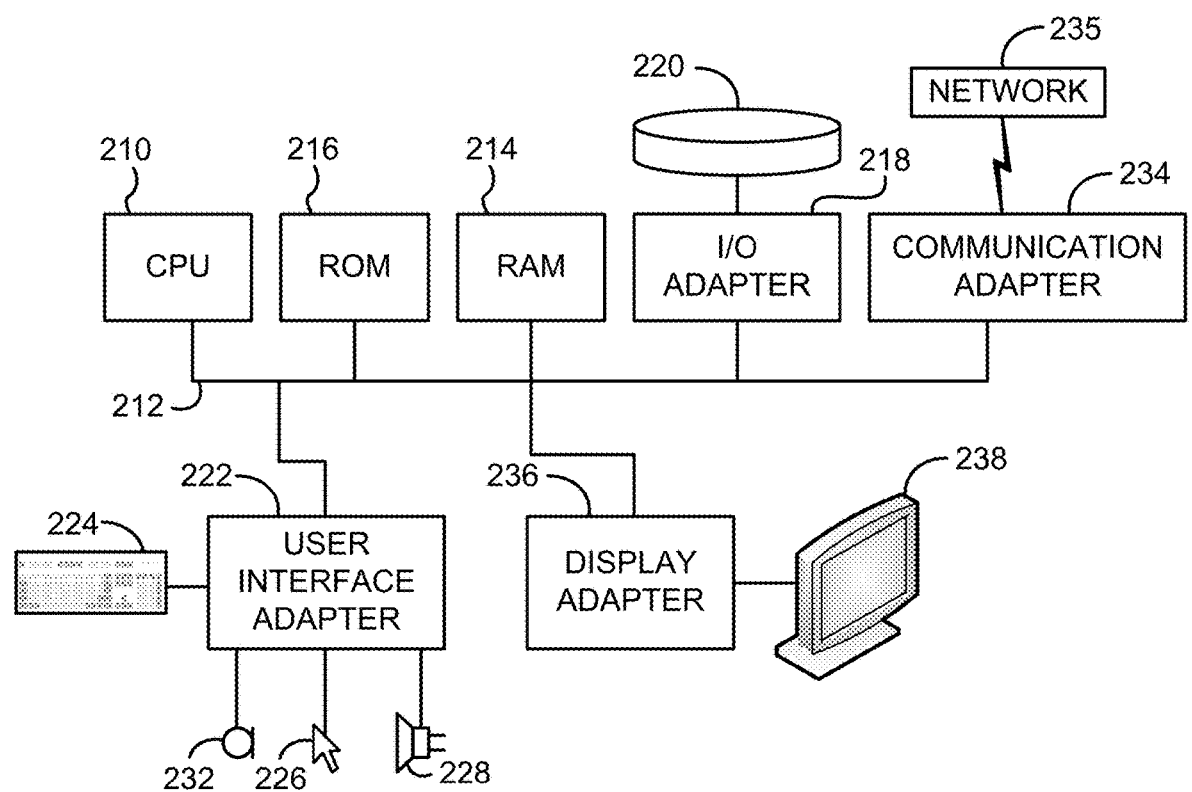
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using XML, C, and/or C++ language, or other programming languages, along with an object oriented programming methodology. Object oriented programming (OOP), which has become increasingly used to develop complex applications, may be used.

Figure 3:
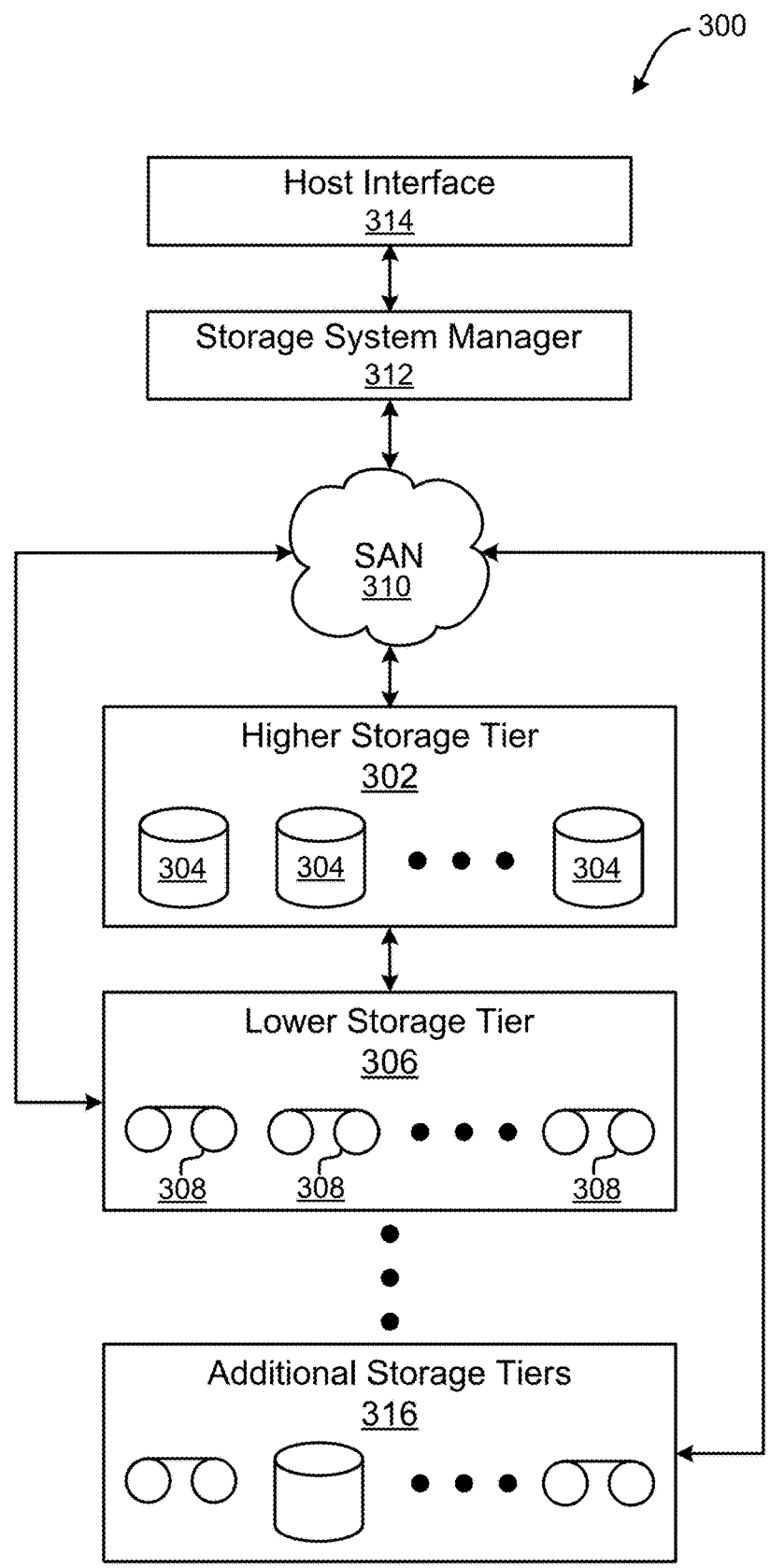
FIG. 3 illustrates a tiered data storage system in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

Figure 4:
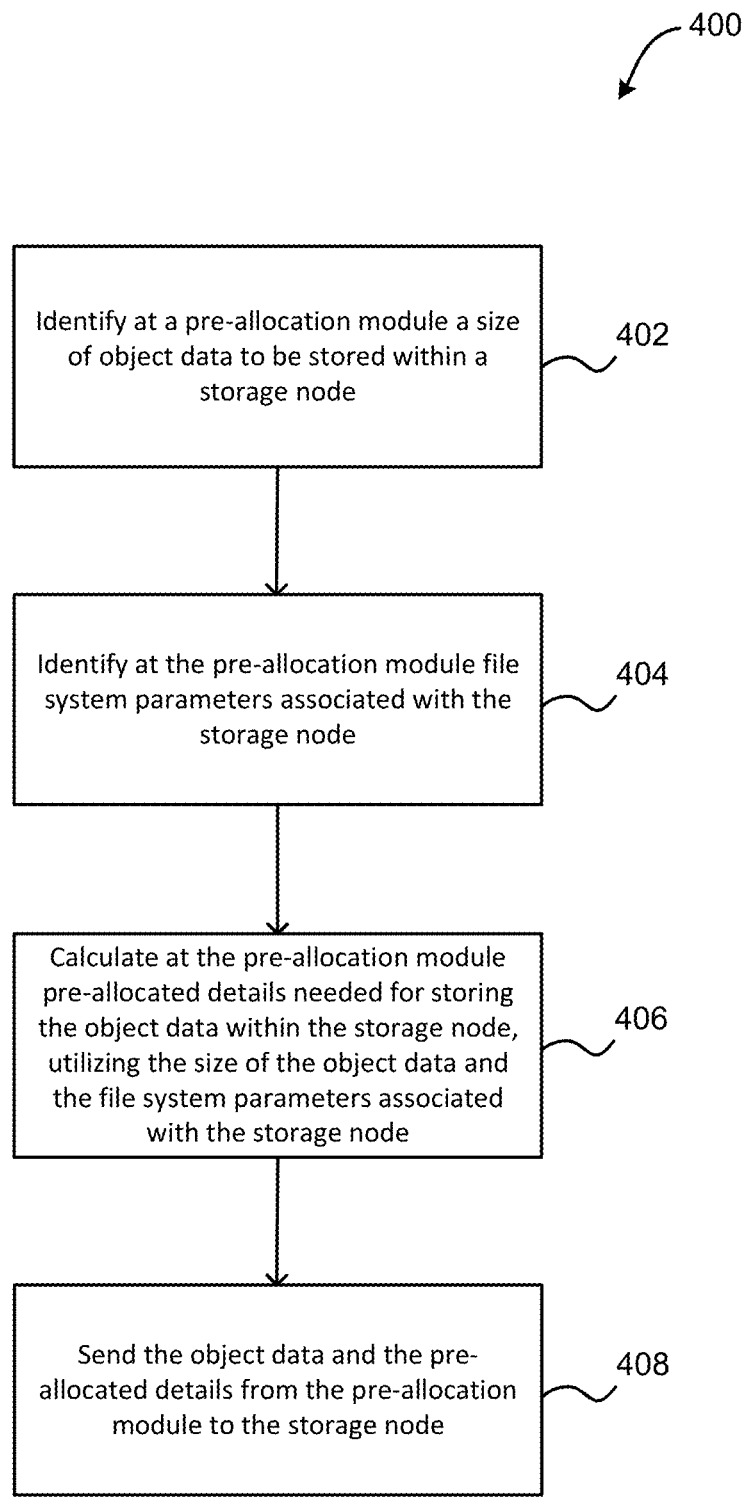
FIG. 4 illustrates a method for pre-allocating filesystem metadata within an object storage system, in accordance with one embodiment.

Now referring to FIG. 4, a flowchart of a method 400 is shown according to one embodiment. The method 400 may be performed in accordance with the present invention in any of the environments depicted in FIGS. 1-3, and 9, among others, in various embodiments. Of course, more or less operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4, method 400 may initiate with operation 402, where a size of object data to be stored within a storage node is identified at a pre-allocation module. In one embodiment, the object data may include a portion of an object (e.g., a chunk of the object, etc.). For example, a single object may be divided into a plurality of network chunks, and each of the plurality of chunks may be written to a single storage node. In another embodiment, the pre-allocation module may include a component of an object storage architecture that manages a pre-allocation policy for inodes, allocation structures, and data blocks within the object storage architecture. In yet another embodiment, the pre-allocation module may be implemented utilizing hardware (e.g., a hardware processor, etc.).

Additionally, in one embodiment, the object data may include an erasure code (EC) portion of the object. For example, the object may be split into a plurality of portions/segments according to the EC schema. In another example, each portion may be encoded using the EC schema. This may result in a data parity fragment to be written to a single storage node.

Further, in one embodiment, the size of the object data may be calculated at a client, at a pre-allocation module, etc. In another embodiment, the storage node may be one of a plurality of storage nodes. In yet another embodiment, the plurality of storage nodes may be included within an object storage architecture. For example, the nodes may include one or more proxy nodes that are used for distributed load handling and request handling. In another example, the nodes may include one or more storage nodes that write to disk/storage subsystems.

Further still, in one embodiment, each of the plurality of nodes may include nodes within a storlet architecture. For example, the storlet architecture may include a compute engine embedded object storage. For instance, each node within the storlet architecture may have an associated virtualization unit (e.g., a virtual machine, etc.).

Also, in one embodiment, the node may be selected based on one or more criteria. For example, each of the plurality of storage nodes may be selected using a ring methodology. In another example, each of the plurality of storage nodes may be selected according to a predetermined EC schema.

In addition, method 400 may proceed with operation 404, where file system parameters associated with the storage node are identified at the pre-allocation module. In one embodiment, the file system parameters may include one or more of a filesystem type utilized within the storage node, a filesystem version utilized within the storage node, a block size utilized within the storage node, a data referring technique utilized within the storage node, memory pointer addresses to data/inode allocation structures utilized within the storage node, free inodes located within the storage node, free data blocks located within the storage node, etc.

Furthermore, in one embodiment, the file system parameters may be obtained by a daemon located on each of the plurality of storage nodes. For example, the daemon may obtain these parameters and may export these parameters to a pre-allocation module.

Further still, method 400 may proceed with operation 406, where pre-allocated details needed for storing the object data within the storage node are calculated at the pre-allocation module, utilizing the size of the object data and the file system parameters associated with the storage node. For example, the size of the object data to be stored and the file system parameters associated with the storage node may be analyzed in association with the object data in order to determine the pre-allocated details needed for storing the object data within the storage node.

Also, in one embodiment, the pre-allocated details may include a free inode address for storing the object data within the storage node. In another embodiment, the pre-allocated details may include one or more data block addresses for storing the object data within the storage node. In yet another embodiment, the pre-allocated details may include data referring pointers needed to store the object data within the storage node.

Additionally, method 400 may proceed with operation 408, where the object data and the pre-allocated details are sent from the pre-allocation module to the storage node. In one embodiment, the object data and pre-allocated details may be determined for and sent to a plurality of nodes simultaneously. In this way, the storage node may manage its own pre-allocation of storage resources. Additionally, a performance of an object storage architecture implementing the storage node may be improved.

Figure 5:
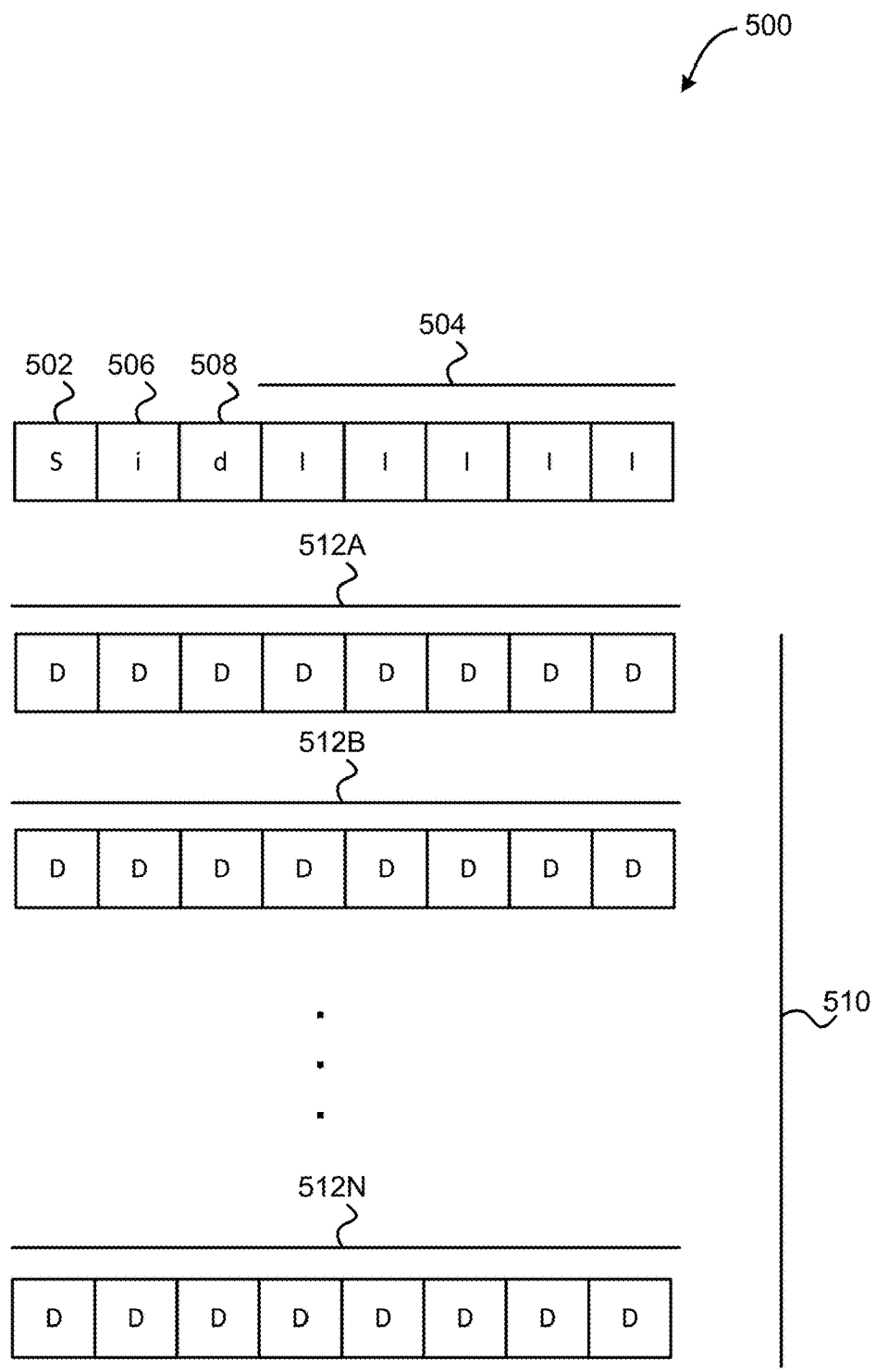
FIG. 5 illustrates an exemplary filesystem organization, in accordance with one embodiment.

FIG. 5 illustrates an exemplary filesystem organization 500, according to one embodiment. As shown, the exemplary filesystem organization 500 includes a plurality of segments 502-510. In one embodiment, the plurality of segments 502-510 may be located within a disk (e.g., a hard disk drive (HDD), etc.) of a single storage node of an object storage architecture.

As shown, the exemplary filesystem organization 500 includes a superblock 502. In one embodiment, the superblock 502 may include information about a file system of the single storage node. For example, the information may include a number of inodes that are located within the file system, a number of data blocks that are located within the file system, a location where an inode table begins, and an identifier (e.g., a "magic number," etc.) to identify the file system type.

Additionally, the exemplary filesystem organization 500 includes an inode table 504. In one embodiment, the inode table 504 may include an array of stored on-disk inodes. For example, for storing file metadata and other information used for tracking, the filesystem may use a structure called an inode, and these inodes may be stored in the inode table 504.

Further, the exemplary filesystem organization 500 includes an inode bitmap 506. In one embodiment, the inode bitmap 506 may include a data structure that includes a plurality of bits, where each bit indicates whether a corresponding inode block is free or in-use. For example, allocation structures (such as the inode bitmap 506) may be used to track whether inode blocks are free or allocated.

Further still, the exemplary filesystem organization 500 includes a data bitmap 508. In one embodiment, the data bitmap 508 may include a data structure including a plurality of bits, where each bit indicates whether a corresponding data block is free or in-use.

Also, the exemplary filesystem organization 500 includes a data region 510. In one embodiment, the data region 510 may include a region of the disk of the single storage node that is used for storing data (e.g., user data, etc.). The data region 510 is divided into a plurality of blocks 512A-N. In another embodiment, the blocks 512A-N may be created based on a predetermined block size.

Figure 6:
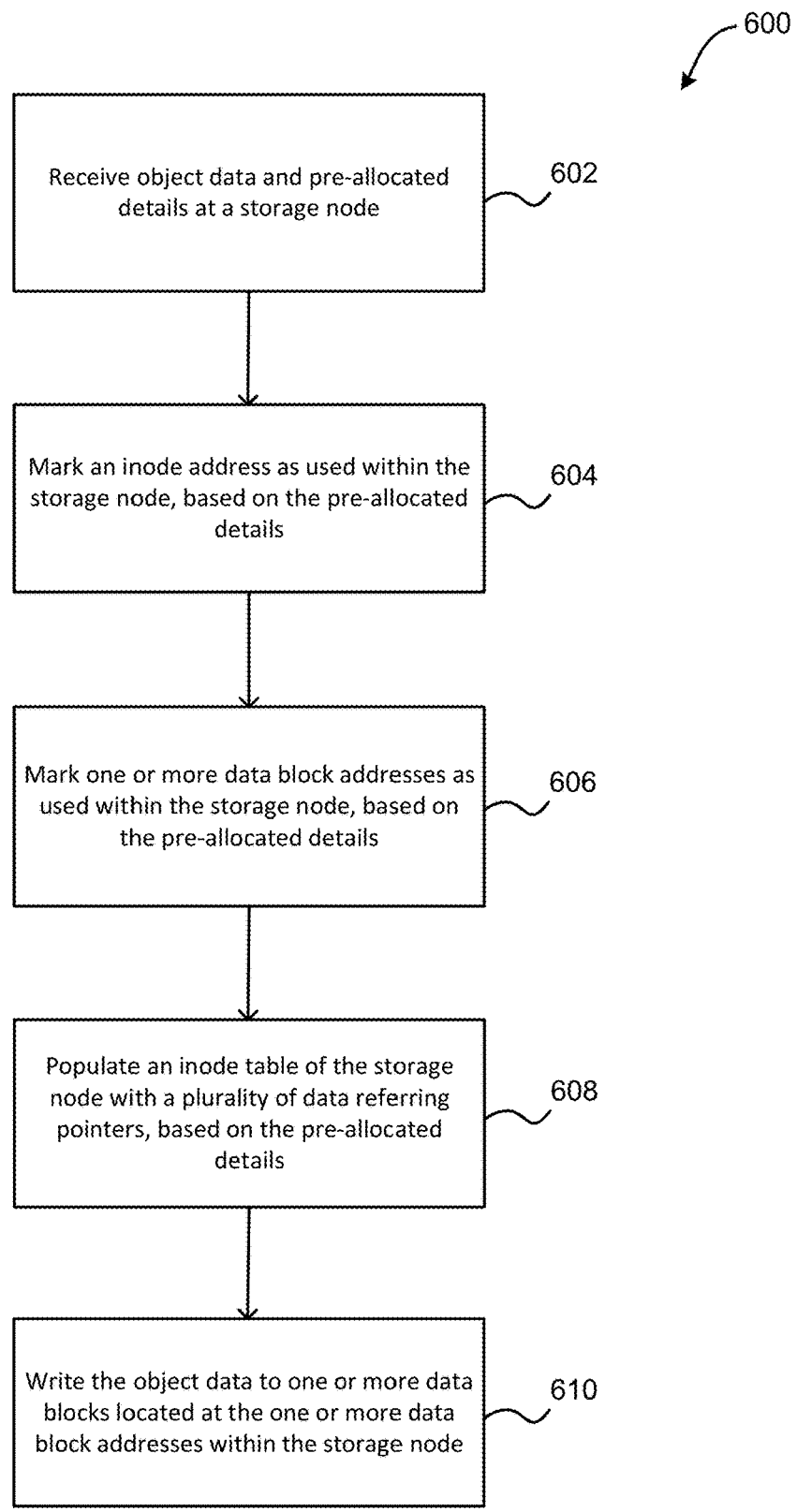
FIG. 6 illustrates a method for implementing pre-allocated details at a storage node, in accordance with one embodiment.

Now referring to FIG. 6, a flowchart of a method 600 for implementing pre-allocated details at a storage node is shown according to one embodiment. The method 600 may be performed in accordance with the present invention in any of the environments depicted in FIGS. 1-3, and 9, among others, in various embodiments. Of course, more or less operations than those specifically described in FIG. 6 may be included in method 600, as would be understood by one of skill in the art upon reading the present descriptions.

Each of the steps of the method 600 may be performed by any suitable component of the operating environment. For example, in various embodiments, the method 600 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 600. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 6, method 600 may initiate with operation 602, where object data and pre-allocated details are received at a storage node. In one embodiment, the object data may include a portion of an object. For example, the object data may include an erasure code (EC) portion of the object. In another embodiment, the storage node may be included within an object storage architecture.

Additionally, in one embodiment, the pre-allocated details may include a free inode address for storing the object data within the storage node. In another embodiment, the pre-allocated details may include one or more data block addresses for storing the object data within the storage node. In yet another embodiment, the pre-allocated details may include data referring pointers needed to store the object data within the storage node.

Further, method 600 may proceed with operation 604, where an inode address is marked as used within the storage node, based on the pre-allocated details. In one embodiment, the inode address may include the free inode address for storing the object data within the storage node that are indicated within the pre-allocated details.

Further still, method 600 may proceed with operation 606, where one or more data block addresses are marked as used within the storage node, based on the pre-allocated details. In one embodiment, the data block addresses may include the one or more data block addresses for storing the object data within the storage node that are indicated within the pre-allocated details.

Also, method 600 may proceed with operation 608, where an inode table of the storage node is populated with a plurality of data referring pointers, based on the pre-allocated details. For example, the data referring pointers may include the data referring pointers needed to store the data within the storage node that are indicated within the pre-allocated details.

In addition, method 600 may proceed with operation 610, where the object data is written to one or more data blocks located at the one or more data block addresses within the storage node.

Figure 7:
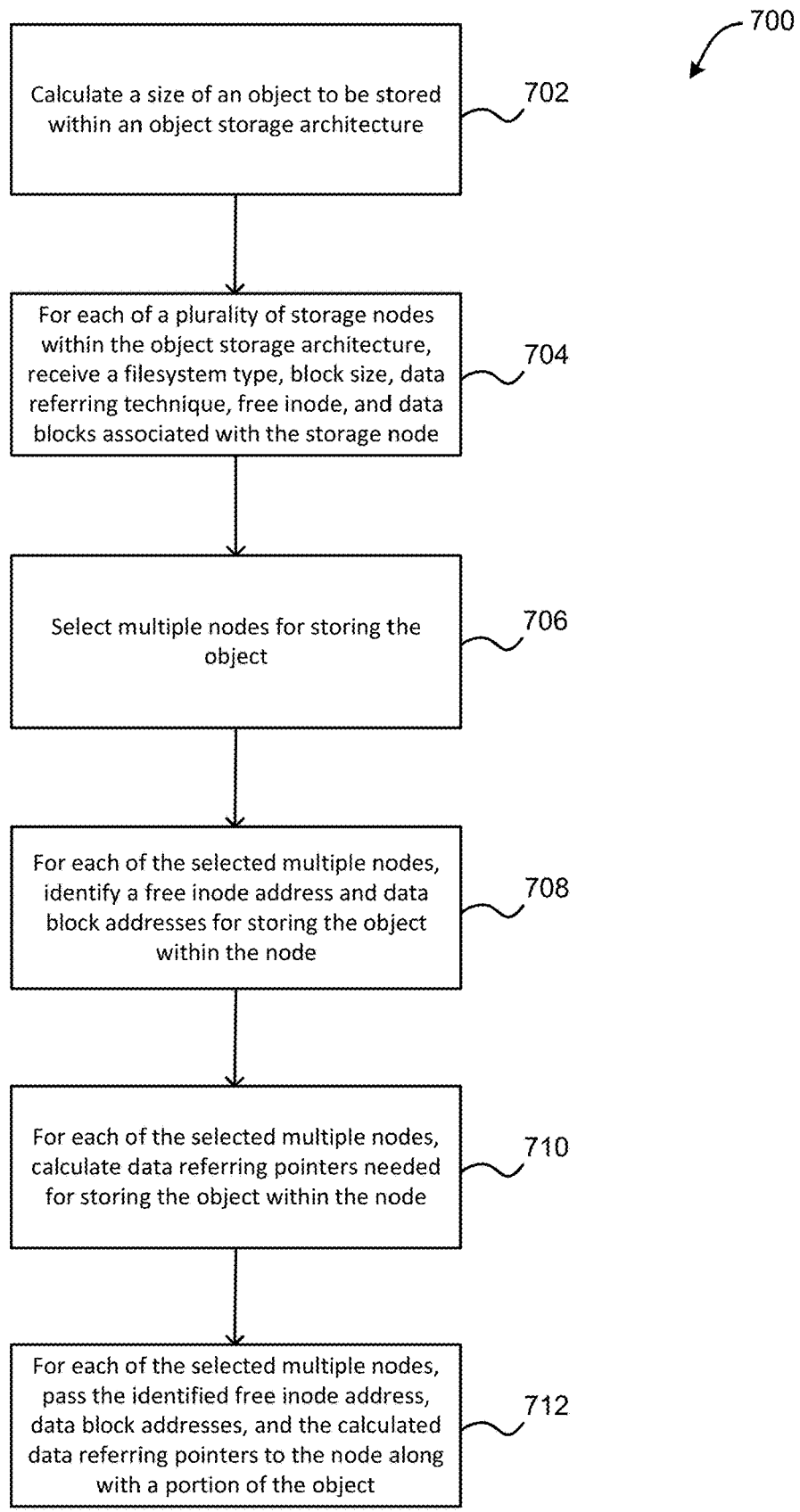
FIG. 7 illustrates a method for implementing pre-allocation details in a traditional replication-supported environment, in accordance with one embodiment.

Now referring to FIG. 7, a flowchart of a method 700 for implementing pre-allocation details in a traditional replication-supported environment is shown according to one embodiment. The method 700 may be performed in accordance with the present invention in any of the environments depicted in FIGS. 1-3 and 9, among others, in various embodiments. Of course, more or less operations than those specifically described in FIG. 7 may be included in method 700, as would be understood by one of skill in the art upon reading the present descriptions.

Each of the steps of the method 700 may be performed by any suitable component of the operating environment. For example, in various embodiments, the method 700 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 700. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 7, method 700 may initiate with operation 702, where a size of an object to be stored within an object storage architecture is calculated. In one embodiment, the calculating may be performed at a client device, at a pre-allocation module, etc. Additionally, method 700 may proceed with operation 704, where for each of a plurality of storage nodes within the object storage architecture, a filesystem type, block size, data referring technique, free inode, and data blocks associated with the storage node are received. In one embodiment, the above information may be retrieved for each storage node by a daemon located on the storage node.

Further, method 700 may proceed with operation 706, where multiple nodes are selected for storing the object. In one embodiment, the node selection may be performed utilizing a ring methodology. In another embodiment, the node selection may be performed such that three copies of the object are stored within the object storage architecture.

Further still, method 700 may proceed with operation 708, where for each of the selected multiple nodes, a free inode address and data block addresses for storing the object within the node are identified. Also, method 700 may proceed with operation 710, where for each of the selected multiple nodes, data referring pointers needed for storing the object within the node are calculated. In addition, method 700 may proceed with operation 712, where for each of the selected multiple nodes, the identified free inode address, data block addresses, and the calculated data referring pointers are all passed to the node along with a portion of the object.

Replication Object Storage Architecture

In one embodiment, a replication object storage architecture may include of two entities/node groups. For example, one node group may be called "proxy nodes" which may be used for distributed load handling/request handling nodes into the namespace. In another example, the other node group may be called "storage nodes" which may be responsible for writing into the disks/storage subsystems. In another embodiment, this architecture may serve as a storage unit/repository. In yet another embodiment, in this architecture, user uploaded/PUT object may be completely stored on a single node, and a predetermined plurality of replicas of the object may be spread across other nodes within the object storage architecture.

Lossless Channel—Replication Object Storage Architecture

In one embodiment, a framework may facilitate a daemon on each node participating in the object storage cluster, and this daemon may collect the file system parameters (e.g., type, version, block size, memory pointer addresses to data/inode allocation structures—current details, etc.) from each storage node, and may export these collected details to a pre-allocation module, for execution on a designated node.

Table 1 illustrates exemplary file system parameters that may be collected by a daemon, in accordance with one embodiment. Of course, it should be noted that the exemplary file system parameters shown in Table 1 are set forth for illustrative purposes only, and thus should not be construed as limiting in any manner.

TABLE 1

Storage-node1 = {arc: replication; type: etx2; version: 5.0; block-size: 512 bytes; data-as: 0x0000123; inode-as: 0x0000456}
Storage-node2 = {arc: replication; type: etx4; version: 1.42.0; block-size: 512 bytes; data-as: 0x0000987; inode-as: 0x0000612}

In one embodiment, based on the size/content length of the object, the following actions may be performed at the pre-allocation module. First, the pre-allocation module may pre-calculate/pre-allocate direct or indirect data block referring pointers (e.g., both count, pointer values) required for storing the complete object in the identified storage nodes. Second, the pre-allocation module may pre-populate the inode table of the identified storage nodes with the pre-calculated direct or indirect data block referring pointers (upon a creation of the object inode). Third, the pre-allocation module may mark/update the inode and data allocation structures with the pre-identified block address as used. Fourth, the pre-allocation module may write the received object chunk to the pre-calculated data block addresses.

Additionally, in one embodiment, an object or file to be stored may be divided into a plurality of chunks. Each network chunk may be received for storage at a storage architecture, along with a size of the overall object/file. A pre-allocation module of the storage architecture may simultaneously replicate the object across multiple storage nodes, where each storage node may take care of its own pre-allocation.

More specifically, at each node, a lookup may be performed at an inode bitmap for a free inode address (for an initial chunk of the object), or an associated inode address (for subsequent chunks). Additionally, each node may pre-allocate a data block address required for the respective object at the data bitmap. Further, within the inode region, each node may pre-calculate and pre-allocate a number of direct/indirect data block pointers required for the respective object, and may pre-populate an inode table with the pre-allocated direct/indirect data block referring pointers upon creation of the inode. Further still, each node may optionally create an inode for the initial chunk within the inode region, and may write the received chunk to the identified free data block in the data region.

Further, in one embodiment, an object or file to be stored may be divided into a plurality of chunks. Each network chunk may be received at a proxy layer. Additionally, the network chunk may be received for storage at a storage architecture, along with a size of the overall object/file and pre-calculated allocation structure details for each node. A pre-allocation module of the storage architecture may simultaneously replicate the object across multiple storage nodes, where each storage node may pre-calculate, pre-allocate, and pre-populate the direct/indirect data block referring pointers.

More specifically, at each node, an inode address that is pre-calculated and passed from a proxy may be marked as used within the inode bitmap. Additionally, a data block address that is pre-calculated and passed from a proxy may be marked as used within the data bitmap. Further, direct/indirect data block referring pointers may be copied from pre-calculated and passed information within the inode region. Further still, each node may optionally create an inode for the initial chunk within the inode region, and may write the received chunk to the passed free data blocks within the data region.

Figure 8:
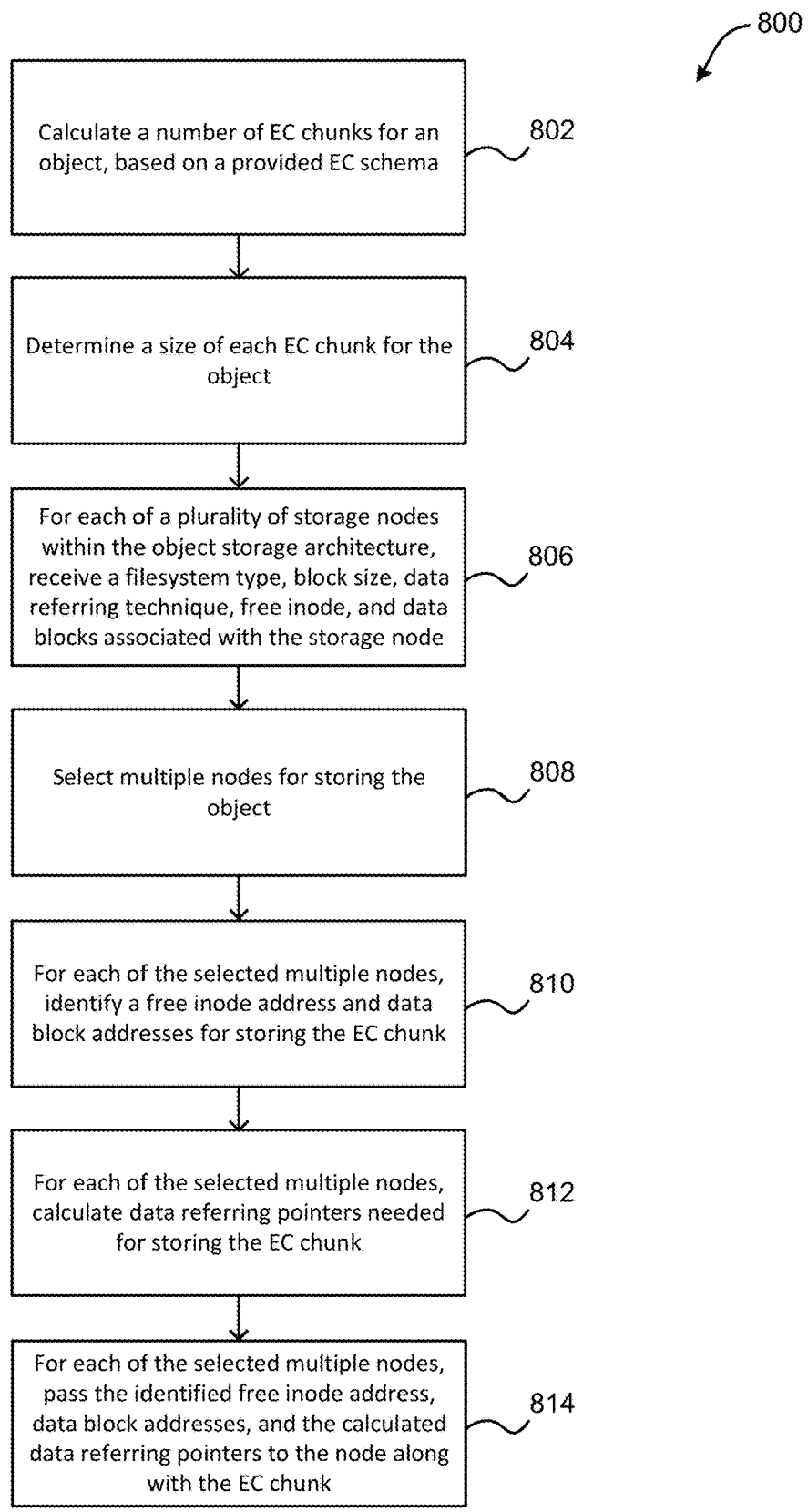
FIG. 8 illustrates a method for implementing pre-allocation details in an erasure code-supported environment, in accordance with one embodiment.

Now referring to FIG. 8, a flowchart of a method 800 for implementing pre-allocation details in an erasure code-supported environment is shown according to one embodiment. The method 800 may be performed in accordance with the present invention in any of the environments depicted in FIGS. 1-3 and 9, among others, in various embodiments. Of course, more or less operations than those specifically described in FIG. 8 may be included in method 800, as would be understood by one of skill in the art upon reading the present descriptions.

Each of the steps of the method 800 may be performed by any suitable component of the operating environment. For example, in various embodiments, the method 800 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 800. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 8, method 800 may initiate with operation 802, where a number of EC chunks are calculated for an object, based on a provided EC schema. In one embodiment, the calculating may be performed at a client device, at a pre-allocation module, etc. Additionally, method 800 may proceed with operation 804, where a size of each EC chunk for the object is determined. For example, a size of EC chunks that the object is to be divided into may be determined. In another embodiment, the EC chunk size calculation may also be performed at a client device, at a pre-allocation module, etc.

Further, method 800 may proceed with operation 806, where for each of a plurality of storage nodes within the object storage architecture, a filesystem type, block size, data referring technique, free inode, and data blocks associated with the storage node are received. In one embodiment, the above data may be retrieved for each storage node by a daemon located on the storage node.

Further still, method 800 may proceed with operation 808, where multiple nodes are selected for storing the object. In one embodiment, the selection may be performed according to a provided EC schema. Also, method 800 may proceed with operation 810, where for each of the selected multiple nodes, a free inode address and data block addresses for storing the EC chunk is identified. In addition, method 800 may proceed with operation 812, where for each of the selected multiple nodes, data referring pointers needed for storing the EC chunk are calculated. Furthermore, method 800 may proceed with operation 814, where for each of the selected multiple nodes, the identified free inode address, data block addresses, and the calculated data referring pointers are passed to the node along with the EC chunk.

Erasure Code Object Storage Architecture

In one embodiment, an erasure code object storage architecture may comprise two entities/node groups (e.g., proxy nodes, and storage nodes) as well as their functionalities. In another embodiment, in this architecture, user uploaded/PUT objects may be split into a plurality of data segments, and each segment may be encoded using an erasure code schema. This may result in multiple data parity fragments, where each fragment may be written to a single node. This may result in a distribution of data parity fragments of a single object across all nodes within the object storage architecture.

Lossless Channel—EC Object Storage Architecture

In one embodiment, a framework may facilitate a daemon on each node participating in the object storage cluster, and this daemon may collect the file system parameters (type, version, block size, memory pointer addresses to data/inode allocation structures—current details) from each storage node, and may export these collected details to a pre-allocation module, for execution on a designated node.

Table 2 illustrates exemplary EC file system parameters that may be collected by a daemon, in accordance with one embodiment. Of course, it should be noted that the exemplary file system parameters shown in Table 2 are set forth for illustrative purposes only, and thus should not be construed as limiting in any manner.

TABLE 2

Storage-node1 = {arc: erasure; type: ext2; version: 5.0; block-size: 512 bytes; data-as: 0x0000123; inode-as: 0x0000456}
Storage-node2 = {arc: erasure; type: ext4; version: 1.42.0; block-size: 512 bytes; data-as: 0x0000987; inode-as: 0x0000612}

In one embodiment, based on the size/content length of the object, as well as a given erasure code (EC) schema, the following actions may be performed at the pre-allocation module. First, the pre-allocation module may calculate a number of EC chunks along with their respective size/content length that get generated as a result of the original object and opted EC schema. Second, the pre-allocation module may pre-calculate/pre-allocate direct or indirect data block referring pointers (e.g., both count, pointer values) required for storing each EC chunk in the respective storage nodes. Third, the pre-allocation module may pre-populate the inode table of the identified storage nodes with the pre-calculated direct or indirect data block referring pointers (upon a creation of the object inode). Fourth, the pre-allocation module may mark/update the inode and data allocation structures with the pre-identified block address as used. Fifth, the pre-allocation module may write the received EC chunk to the pre-calculated data block addresses.

Additionally, in one embodiment, an object or file to be stored may be divided into a plurality of chunks. Each network chunk may be received at a proxy layer, and a number of EC chunks may be calculated, based on a predetermined EC schema. Each chunk may then be received for storage at a storage architecture, along with a size of the EC chunk. A pre-allocation module of the storage architecture may then send the chunks across multiple storage nodes, where each storage node may take care of its own pre-allocation.

More specifically, at each node, a lookup for a free inode address (for an initial chunk of the object), or an associated inode address (for subsequent chunks) may be performed at an inode bitmap. Additionally, each node may pre-allocate a data block address required for the respective object (e.g., all EC chunks) at a data bitmap. Further, within an inode region, each node may pre-calculate and pre-allocate a number of direct/indirect data block pointers required for the respective object, and may pre-populate an inode table with the pre-allocated direct/indirect data block referring pointers upon creation of the inode. Further still, each node may optionally create an inode for the initial chunk at an inode region, and may write the received chunk to the identified free data block within the data region.

Further, in one embodiment, an object or file to be stored may be divided into a plurality of chunks. Each network chunk may be received at a proxy layer, and a number of EC chunks may be calculated, based on a predetermined EC schema. Additionally, each chunk may be received for storage at a storage architecture, along with a size of the overall object/file and pre-calculated allocation structure details for each node. A pre-allocation module of the storage architecture may send the chunks across multiple storage nodes, where each storage node may pre-calculate, pre-allocate, and pre-populate the direct/indirect data block referring pointers.

More specifically, at each node, an inode address that is pre-calculated and passed from a proxy may be marked as used at an inode bitmap. Additionally, a data block address that is pre-calculated and passed from a proxy may be marked as used at a data bitmap. Further, direct/indirect data block referring pointers may be copied from pre-calculated and passed information at an inode region. Further still, each node may optionally create an inode for the initial chunk at the inode region, and may write the received chunk to the passed free data blocks within the data region.

Figure 9:
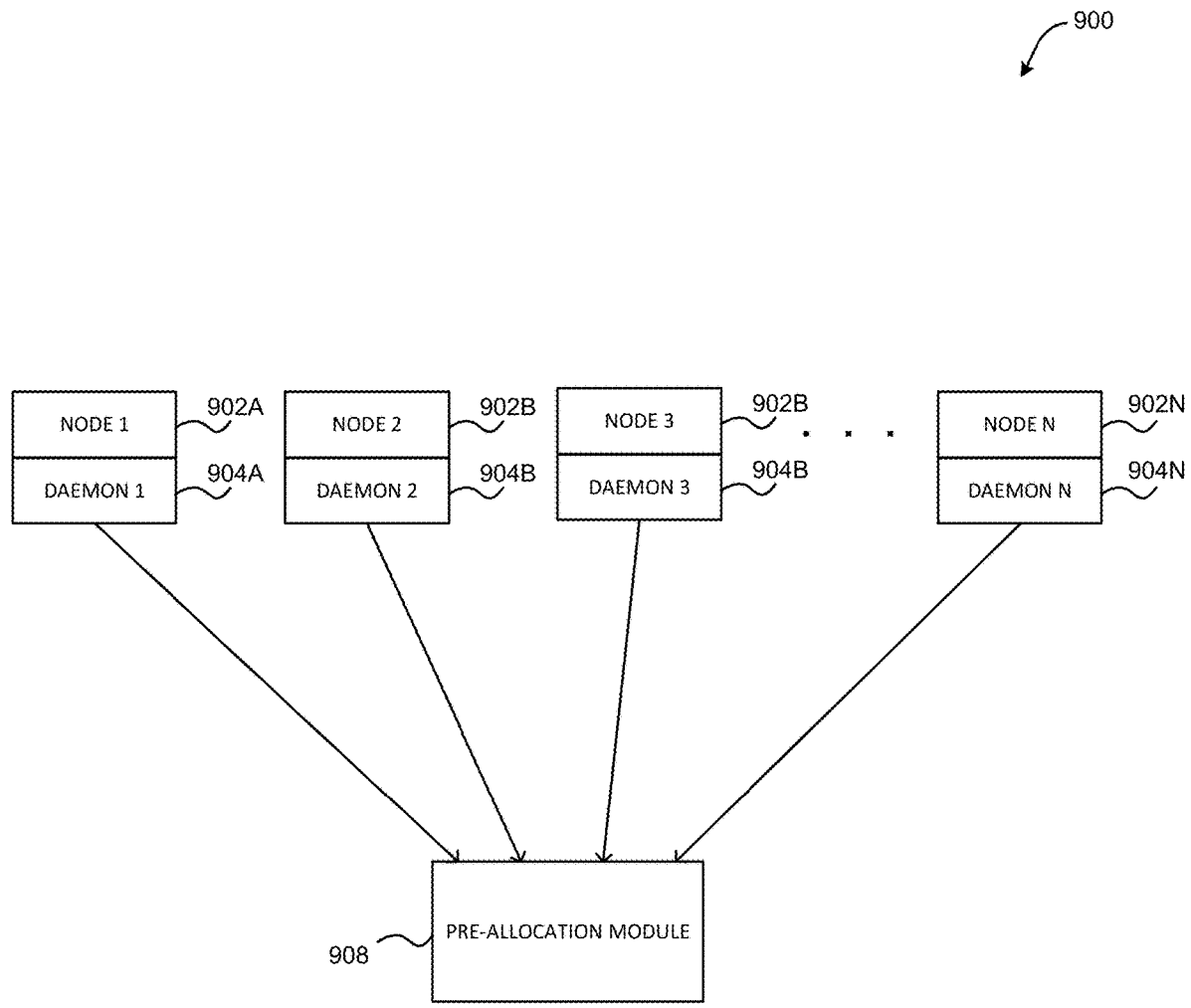
FIG. 9 illustrates an exemplary framework for collecting and exporting file system parameters, in accordance with one embodiment.

FIG. 9 illustrates an exemplary framework 900 for collecting and exporting file system parameters, according to one embodiment. As shown, an object storage cluster includes a plurality of object storage nodes 902A-N. In one embodiment, each of the plurality of object storage nodes 902A-N may include one of two entities/node groups. For example, one or more of the plurality of object storage nodes 902A-N may include a proxy node which may be used for distributed load handling/request handling into the namespace. In another example, one or more of the plurality of object storage nodes 902A-N may include a storage node that is responsible for writing into disks/storage subsystems.

Further, each of the plurality of object storage nodes 902A-N includes its own daemon 904A-N. In one embodiment, for each of the plurality of object storage nodes 902A-N, the daemon 904A-N located on that node may collect file system parameters for that node. For instance, the daemon 904A may collect file system parameters for the object storage node 902A, the daemon 904B may collect file system parameters for the object storage node 902A, etc.

Also, each of the daemons 904A-N are in communication with a pre-allocation module 908. In one embodiment, each of the daemons 904A-N may report their collected file system parameters to the pre-allocation module 908. In another embodiment, the pre-allocation module 908 may store the received file system parameters.

Lossy Channel—Replication, EC Object Storage Architecture

In one embodiment, the framework may facilitate a health check utility that may execute on each storage node participating in the object storage cluster. This health check utility may perform data validation by comparing the details populated in the inode table, inode/data allocation structures, and object data written in the data block addresses. For example, the health check utility may verify that a particular object has an entry in the inode table populated with data referring pointers, but that the data block addresses do not contain written data. In response to this verification, the health check utility may remove object details populated in the inode table.

In this way, a pre-allocation policy may pre-allocate inodes, pre-populate allocation structures (e.g., inode bitmaps, etc.), and may pre-allocate/update an inode with data blocks (disk addresses) within a filesystem used for supporting an object storage workload (e.g., traditional full-copy as well as erasure code (EC) supported object storage environments), based on an incoming object content length and an opted EC schema or replication factor.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
identifying a size of an object to be stored;
dividing the object into a plurality of portions;
selecting a plurality of storage nodes for storing the plurality of portions of the object;
receiving, from a daemon located on each of the plurality of storage nodes, file system parameters associated with each of the plurality of storage nodes;
calculating, for each of the plurality of storage nodes, pre-allocated details needed for storing one of the plurality of portions of the object within the storage node, where for each of the plurality of storage nodes, the calculating is based on a size of the portion of the object to be stored at the storage node and the received file system parameters associated with the storage node, and the pre-allocated details include:
a free inode address and data block addresses for storing one of the plurality of portions of the object within the storage node, and
data referring pointers for storing one of the plurality of portions of the object within the storage node; and
for each of the plurality of storage nodes, sending to the storage node one of the plurality of portions of the object and the pre-allocated details calculated for the storage node.

2. The computer-implemented method of claim 1, wherein the plurality of portions each includes an erasure code (EC) portion of the object.

3. The computer-implemented method of claim 1, wherein the plurality of storage nodes is included within an object storage architecture.

4. The computer-implemented method of claim 1, wherein the file system parameters include a filesystem type utilized within the storage node, a filesystem version utilized within the storage node, a block size utilized within the storage node, a data referring technique utilized within the storage node, and memory pointer addresses to allocation structures utilized within the storage node.

5. The computer-implemented method of claim 1, wherein the file system parameters include:
a filesystem type utilized within the storage node,
a filesystem version utilized within the storage node,
a block size utilized within the storage node,
a data referring technique utilized within the storage node,
memory pointer addresses to inode allocation structures utilized within the storage node,
free inodes located within the storage node, and
free data blocks located within the storage node.

6. The computer-implemented method of claim 1, wherein dividing the object into the plurality of portions includes:
dividing the object into the plurality of portions according to an erasure code schema, and encoding each of the plurality of portions using the erasure code schema.

7. The computer-implemented method of claim 1, wherein for each of the plurality of storage nodes, the file system parameters include free inodes and free data blocks located within the storage node.

8. The computer-implemented method of claim 1, wherein the plurality of storage nodes includes a subset of all storage nodes within an object storage architecture for storing the object, and the plurality of storage nodes is selected using a ring methodology.

9. The computer-implemented method of claim 1, wherein the plurality of storage nodes is selected using a ring methodology.

10. The computer-implemented method of claim 1, wherein the plurality of storage nodes is selected according to a predetermined EC schema.

11. A computer program product for pre-allocating filesystem metadata within an object storage system, the computer program product comprising a computer readable storage medium having program instructions embodied therewith, wherein the computer readable storage medium is not a transitory signal per se, the program instructions executable by a processor to cause the processor to perform a method comprising:
identifying, by the processor, a size of an object to be stored;
dividing, by the processor, the object into a plurality of portions;
selecting, by the processor, a plurality of storage nodes for storing the plurality of portions of the object;
receiving, by the processor from a daemon located on each of the plurality of storage nodes, file system parameters associated with each of the plurality of storage nodes;
calculating, by the processor for each of the plurality of storage nodes, pre-allocated details needed for storing one of the plurality of portions of the object within the storage node, where for each of the plurality of storage nodes, the calculating is based on a size of the portion of the object to be stored at the storage node and the received file system parameters associated with the storage node, and the pre-allocated details include:
a free inode address and data block addresses for storing one of the plurality of portions of the object within the storage node, and
data referring pointers for storing one of the plurality of portions of the object within the storage node; and
for each of the plurality of storage nodes, sending by the processor to the storage node one of the plurality of portions of the object and the pre-allocated details calculated for the storage node.

12. The computer program product of claim 11, wherein the plurality of portions each includes an erasure code (EC) portion of the object.

13. The computer program product of claim 11, wherein the plurality of storage nodes is included within an object storage architecture.

14. The computer program product of claim 11, wherein the file system parameters include a filesystem type utilized within the storage node, a filesystem version utilized within the storage node, a block size utilized within the storage node, a data referring technique utilized within the storage node, and memory pointer addresses to allocation structures utilized within the storage node.

15. The computer program product of claim 11, wherein the file system parameters include:
a filesystem type utilized within the storage node,
a filesystem version utilized within the storage node,
a block size utilized within the storage node,
a data referring technique utilized within the storage node,
memory pointer addresses to inode allocation structures utilized within the storage node,
free inodes located within the storage node, and
free data blocks located within the storage node.

16. The computer program product of claim 11, wherein dividing the object into the plurality of portions includes:
dividing the object into the plurality of portions according to an erasure code schema, and encoding each of the plurality of portions using the erasure code schema.

17. The computer program product of claim 11, wherein, for each of the plurality of storage nodes, the file system parameters include free inodes and free data blocks located within the storage node.

18. The computer program product of claim 11, wherein the plurality of storage nodes includes a subset of all storage nodes within an object storage architecture for storing the object, and the plurality of storage nodes is selected using a ring methodology.

19. The computer program product of claim 11, wherein the plurality of storage nodes is selected using a ring methodology.

20. A system, comprising:
a processor; and
logic integrated with the processor, executable by the processor, or integrated with and executable by the processor, the logic being configured to:
identify a size of an object to be stored;
divide the object into a plurality of portions;
select a plurality of storage nodes for storing the plurality of portions of the object;
receive, from a daemon located on each of the plurality of storage nodes, file system parameters associated with each of the plurality of storage nodes;
calculate, for each of the plurality of storage nodes, pre-allocated details needed for storing one of the plurality of portions of the object within the storage node, where for each of the plurality of storage nodes, the calculating is based on a size of the portion of the object to be stored at the storage node and the received file system parameters associated with the storage node, and the pre-allocated details include:
a free inode address and data block addresses for storing one of the plurality of portions of the object within the storage node, and
data referring pointers for storing one of the plurality of portions of the object within the storage node; and
for each of the plurality of storage nodes, send to the storage node one of the plurality of portions of the object and the pre-allocated details calculated for the storage node.

\* \* \* \* \*